US012803130B2

(12) United States Patent
Li et al.

(10) Patent No.: US 12,803,130 B2
(45) Date of Patent: Nov. 17, 2026

(54) BATTERY CELL, BATTERY, ELECTRICAL DEVICE, AND DEVICE AND METHOD FOR MANUFACTURING BATTERY CELL

(71) Applicant: CONTEMPORARY AMPEREX TECHNOLOGY (HONG KONG) LIMITED, Hong Kong (CN)

(72) Inventors: Zhen Li, Ningde (CN); Xiangyun Bai, Ningde (CN); Wenqi Zhu, Ningde (CN); Yuqian Wen, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 523 days.

(21) Appl. No.: 18/492,151

(22) Filed: Oct. 23, 2023

(65) Prior Publication Data

US 2024/0047836 A1 Feb. 8, 2024

Related U.S. Application Data

(63) Continuation of application No. PCT/CN2022/073301, filed on Jan. 21, 2022.

(51) Int. Cl.
*H01M 50/533* (2021.01)
*H01M 50/107* (2021.01)
(Continued)

(52) U.S. Cl.
CPC ....... *H01M 50/533* (2021.01); *H01M 50/107* (2021.01); *H01M 50/152* (2021.01);
(Continued)

(58) Field of Classification Search
CPC ................ H01M 10/00–667; H01M 50/00–77
(Continued)

(56) References Cited

U.S. PATENT DOCUMENTS

2005/0260489 A1* 11/2005 Kim .................... H01M 50/533 429/163
2008/0305393 A1* 12/2008 Nakai ............... H01M 10/0431 429/209
2016/0372734 A1 12/2016 Berthe De Pommery et al.

FOREIGN PATENT DOCUMENTS

CN 203932178 U 11/2014
CN 204257411 U 4/2015
(Continued)

OTHER PUBLICATIONS

CN-105655530-A English (Year: 2016).*
(Continued)

*Primary Examiner* — Bach T Dinh
(74) *Attorney, Agent, or Firm* — Ladas & Parry, LLP

(57) ABSTRACT

A battery cell, a battery, an electrical device, and a device and method for manufacturing a battery cell are described. The battery cell includes a shell, an electrode assembly, and a current collecting member, where the electrode assembly is accommodated in the shell, and the electrode assembly is provided with a tab; the current collecting member includes a first connecting part and a second connecting part which are connected, the first connecting part is used to be welded to the tab, and the second connecting part is used to be welded to the shell; and the first connecting part and the second connecting part are made of different materials, the first connecting part and the tab are made of the same material, and the second connecting part and the shell are made of the same material.

13 Claims, 10 Drawing Sheets

(51) Int. Cl.
*H01M 50/152* (2021.01)
*H01M 50/534* (2021.01)
*H01M 50/536* (2021.01)
*H01M 50/545* (2021.01)
*H01M 50/566* (2021.01)

(52) U.S. Cl.
CPC ....... *H01M 50/534* (2021.01); *H01M 50/536* (2021.01); *H01M 50/545* (2021.01); *H01M 50/566* (2021.01); *H01M 2220/20* (2013.01)

(58) Field of Classification Search
USPC .................................................. 136/243–265
See application file for complete search history.

(56) References Cited

FOREIGN PATENT DOCUMENTS

| | | | | | |
|---|---|---|---|---|---|
| CN | 105655530 | A | * | 6/2016 | .......... H01M 50/502 |
| CN | 108428921 | A | | 8/2018 | |
| CN | 209183657 | U | | 7/2019 | |
| CN | 209592034 | U | | 11/2019 | |
| CN | 111106299 | A | | 5/2020 | |
| CN | 113258124 | A | | 8/2021 | |
| CN | 215377441 | U | | 12/2021 | |
| EP | 3975301 | A1 | * | 3/2022 | .......... H01M 50/536 |
| JP | 2009123440 | A | | 6/2009 | |
| JP | 2009245771 | A | | 10/2009 | |
| JP | 2012209260 | A | | 10/2012 | |
| KR | 20050121898 | A | | 12/2005 | |
| WO | 2019148662 | A1 | | 8/2019 | |

OTHER PUBLICATIONS

ISR for International Application PCT/CN2022/073301 mailed Oct. 27, 2022.

Chinese Office Action dated Sep. 18, 2025 for application CN 202280018044.X.

Notice of Grant dated Nov. 19, 2025 for application CN 202280018044.X.

Extended European Search Report dated May 12, 2025 for application EP 22921164.4.

Written Opinion dated Oct. 26, 2022 for application PCT/CN2022/073301.

* cited by examiner

BATTERY CELL, BATTERY, ELECTRICAL DEVICE, AND DEVICE AND METHOD FOR MANUFACTURING BATTERY CELL

CROSS-REFERENCE TO RELATED APPLICATIONS

This application is a continuation of International application PCT/CN2022/073301 filed on Jan. 21, 2022, the subject matter of which is incorporated herein in its entirety.

TECHNICAL FIELD

The present application relates to the technical field of batteries, and in particular relates to a battery cell, a battery, an electrical device, and a device and method for manufacturing a battery cell.

BACKGROUND

Batteries commonly used in vehicles are usually lithium-ion batteries. As rechargeable batteries, lithium-ion batteries have the advantages of small size, high energy density, high power density, multiple cycles of use, long storage time, and the like.

A battery cell generally includes a shell, an end cover assembly, and an electrode assembly, wherein the shell is covered with the end cover assembly to provide a closed space for the electrode assembly and an electrolyte solution, and the electrical energy of the electrode assembly can be led out of the shell through electrode terminals of the end cover assembly.

To ensure installation of a battery cell, it is necessary for each part of the battery cell to have fine airtightness. Therefore, how to improve the airtightness of various parts of a battery cell is an urgent problem to be solved in battery technologies.

SUMMARY OF THE INVENTION

Embodiments of the present application provide a battery cell, a battery, an electrical device, and a device and method for manufacturing a battery cell to solve the problem of poor airtightness of existing battery cells.

In a first aspect, embodiments of the present application provide a battery cell, including a shell, an electrode assembly, and a current collecting member, where the electrode assembly is accommodated in the shell, and the electrode assembly is provided with a tab; the current collecting member includes a first connecting part and a second connecting part which are connected, the first connecting part is used to be welded to the tab, and the second connecting part is used to be welded to the shell to achieve electrical connection between the tab and the shell; and the first connecting part and the second connecting part are made of different materials, the first connecting part and the tab are made of the same material, and the second connecting part and the shell are made of the same material.

In the above technical solution, the second connecting part of the current collecting member is used to be welded to the shell, and the second connecting part and the shell are made of the same material. Therefore, the second connecting part and the shell have the same coefficient of thermal expansion, and in the process of welding the second connecting part to the shell, atoms from the second connecting part and the shell will enter each other. In the cooling process, due to the same coefficient of expansion, the welding position shrinks evenly, and cracks will not occur at the welding position due to uneven shrinkage, thereby reducing the risk that the airtightness of the battery cell is reduced due to welding, and improving the safety of the battery cell. The first connecting part of the current collecting member is used to be welded to the tab, and the first connecting part and the tab are made of the same material. Therefore, the first connecting part and the tab have the same coefficient of thermal expansion, and in the process of welding the first connecting part to the tab, atoms from the first connecting part and the tab will enter each other. In the cooling process, due to the same coefficient of expansion, the welding position shrinks evenly, so that the tab and the current collecting member form fine electrical connection and improve the conduction stability.

In some embodiments of the first aspect of the present application, the first connecting part and the second connecting part are stacked along the thickness direction of the current collecting member, and the first connecting part is arranged on the side of the second connecting part facing the electrode assembly.

In the above technical solution, the first connecting part and the second connecting part are stacked along the thickness direction of the current collecting member, and the first connecting part is arranged on the side of the second connecting part facing the electrode assembly. In other words, along the thickness direction of the current collection member, the first connecting part is arranged close to the tab, and the second connecting part is arranged close to the shell, facilitating welding the first connecting part to the tab, and welding the second connecting part to the shell.

In some embodiments of the first aspect of the present application, the second connecting part is provided with hollow parts penetrating through the second connecting part along the thickness direction; and a welding area is formed at a position of the first connecting part corresponding to the hollow parts, and is used to be welded to the tab.

In the above technical solution, the second connecting part is provided with the hollow parts, and the welding area is formed at the position of the first connecting part corresponding to the hollow parts. Therefore, when the first connecting part is welded to the tab, the welding heat is transferred through the first connecting part in the welding area, without the need of being transferred through the second connecting part before being transferred through the first connecting part, thereby shortening the transfer path of the welding heat, facilitating welding, and improving the welding quality and efficiency.

In some embodiments of the first aspect of the present application, the edge of the second connecting part is flush with the edge of the first connecting part.

In the above technical solution, the edge of the second connecting part is flush with the edge of the first connecting part, making the structure of the current collecting member more regular, facilitating installing the current collecting member and welding the current collecting member to the tab and the shell, and also reducing the risk of interference of the current collecting member with other structures of the battery cell.

In some embodiments of the first aspect of the present application, the first connecting part and the second connecting part are arranged coaxially and have equal radii.

In the above technical solution, the first connecting part and the second connecting part are arranged coaxially, facilitating stacked arrangement of the first connecting part and the second connecting part. The first connecting part and the second connecting part have equal radii, so that the edge of the second connecting part is flush with the edge of the first connecting part, making the structure of the current collecting member more regular, facilitating installing the current collecting member and welding the current collecting member to the tab and the shell, and also reducing the risk of interference of the current collecting member with other structures of the battery cell.

In some embodiments of the first aspect of the present application, the edge of the second connecting part extends the edge of the first connecting part.

In the above technical solution, the edge of the second connecting part extends the edge of the first connecting part, so that the portion of the second connecting part extending the first connecting part forms a step surface. The portion of the second connecting part extending the first connecting part may be welded to the shell, facilitating welding the second connecting part to the shell, and also reducing the effect of heat generated during welding the second connecting part to the shell on the first connecting part and the tab.

In some embodiments of the first aspect of the present application, the first connecting part and the second connecting part are arranged coaxially, and the radius of the second connecting part is greater than the radius of the first connecting part.

In the above technical solution, the first connecting part and the second connecting part are arranged coaxially, facilitating stacked arrangement of the first connecting part and the second connecting part. The radius of the second connecting part is greater than the radius of the first connecting part, so that a step surface is formed between the first connecting part and the second connecting part. The portion of the second connecting part extending the first connecting part may be welded to the shell, facilitating welding the second connecting part to the shell, and also reducing the effect of heat generated during welding the second connecting part to the shell on the first connecting part and the tab.

In some embodiments of the first aspect of the present application, the second connecting part encloses the periphery of the first connecting part.

In the above technical solution, the second connecting part encloses the periphery of the first connecting part, so that the outer ring of the current collecting member is welded to the shell, while the inner ring of the current collecting member is welded to the tab, facilitating welding the current collecting member to the shell and the tab, and also reducing the risk of mutual effect between the welding position of the first connecting part to the tab and the welding position of the second connecting part to the shell.

In some embodiments of the first aspect of the present application, the first connecting part is provided with a first surface facing the electrode assembly, the second connecting part is provided with a second surface facing the electrode assembly, the first surface is closer to the electrode assembly than the second surface, and the first surface abuts against the tab.

In the above technical solution, the first surface of the first connecting part facing the electrode assembly is closer to the electrode assembly than the second surface of the second connecting part facing the electrode assembly, facilitating welding after the first surface abuts against the tab to form stable electrical connection.

In some embodiments of the first aspect of the present application, the current collecting member is arranged in the shell; the shell includes a case and an end cover; the case is provided with a first opening; the end cover is used to cover the first opening; and the end cover is used to be connected to the second connecting part.

In the above technical solution, the end cover of the shell being used to be welded to the second connecting part can match the assembly process of the battery cell and facilitate assembling the battery cell.

In some embodiments of the first aspect of the present application, the shell is provided with a second opening, and the current collecting member is used to cover the second opening.

In the above technical solution, the current collecting member is used to cover the second opening of the shell, that is, the current collecting member can output the electrical energy of the battery cell and also form a space with the shell to accommodate the electrode assembly, achieving versatility, reducing the number of structural components of the battery cell, and reducing the difficulty of assembly.

In some embodiments of the first aspect of the present application, the first connecting part is made of copper; and/or, the second connecting part is made of steel.

In the above technical solution, the first connecting part is made of copper, so the tab is also made of copper to ensure preferable conductivity between the tab and the first connecting part. The second connecting part is made of steel, so the shell is also made of steel to make the shell have preferable strength.

In some embodiments of the first aspect of the present application, the battery cell is cylindrical.

In the above technical solution, the battery cell is cylindrical, and has the advantages of high capacity, long cycle life, a wide range of operating environment temperature, and the like.

In a second aspect, embodiments of the present application provide a battery, including the battery cell according to embodiments of the first aspect.

In the above technical solution, the shell of the battery cell is welded to the second connecting part made of the same material as the shell. In the cooling process after welding, due to the same coefficient of expansion, the welding position shrinks evenly, and cracks will not occur at the welding position due to uneven shrinkage, thereby reducing the risk that the airtightness of the battery cell is reduced due to welding, improving the safety of the battery cell, and further improving the safety of the battery.

In a third aspect, embodiments of the present application provide an electrical device, including the battery according to embodiments of the second aspect.

In the above technical solution, the shell of the battery cell of the battery is welded to the second connecting part made of the same material as the shell. In the cooling process after welding, due to the same coefficient of expansion, the welding position shrinks evenly, and cracks will not occur at the welding position due to uneven shrinkage, thereby reducing the risk that the airtightness of the battery cell is reduced due to welding, improving the safety of the battery cell, further improving the safety of the battery, and even further improving electrical safety.

In a fourth aspect, embodiments of the present application provide a device for manufacturing a battery cell, including a provision apparatus and an assembling apparatus, where the provision apparatus is configured to provide a shell, an electrode assembly, and a current collecting member, and the electrode assembly is provided with a tab; the current collecting member includes a first connecting part and a second connecting part which are connected, the first connecting part is used to be welded to the tab, and the second connecting part is used to be welded to the shell to achieve electrical connection between the tab and the shell; the first connecting part and the second connecting part are made of different materials, the first connecting part and the tab are made of the same material, and the second connecting part and the shell are made of the same material; and the assembling apparatus is configured to accommodate the electrode assembly in the shell, weld the first connecting part to the tab, and weld the second connecting part to the shell.

In the fifth aspect, embodiments of the present application provide a method for manufacturing a battery cell, including the following steps:

providing a shell, an electrode assembly, and a current collecting member, where the electrode assembly is provided with a tab; the current collecting member includes a first connecting part and a second connecting part which are connected, the first connecting part is used to be welded to the tab, and the second connecting part is used to be welded to the shell to achieve electrical connection between the tab and the shell; and the first connecting part and the second connecting part are made of different materials, the first connecting part and the tab are made of the same material, and the second connecting part and the shell are made of the same material;

accommodating the electrode assembly in the shell;

welding the first connecting part to the tab; and welding the second connecting part to the shell.

In the above technical solution, the second connecting part of the current collecting member is used to be welded to the shell, and the second connecting part and the shell are made of the same material. Therefore, the second connecting part and the shell have the same coefficient of thermal expansion, and in the process of welding the second connecting part to the shell, atoms from the second connecting part and the shell will enter each other. In the cooling process, due to the same coefficient of expansion, the welding position shrinks evenly, and cracks will not occur at the welding position due to uneven shrinkage, thereby reducing the risk that the airtightness of the battery cell is reduced due to welding, and improving the safety of the battery cell. The first connecting part of the current collecting member is used to be welded to the tab, and the first connecting part and the tab are made of the same material. Therefore, the first connecting part and the tab have the same coefficient of thermal expansion, and in the process of welding the first connecting part to the tab, atoms from the first connecting part and the tab will enter each other. In the cooling process, due to the same coefficient of expansion, the welding position shrinks evenly, so that the tab and the current collecting member form fine electrical connection and improve the conduction stability.

DESCRIPTION OF DRAWINGS

To more clearly describe the technical solutions of the embodiments of the present application, the drawings to be used in the embodiments will be briefly introduced below, and it should be understood that the following drawings only show some embodiments of the present application, and therefore should not be considered as limiting the scope of the present application. For those of ordinary skills in the art, other relevant drawings may also be obtained based on these drawings without creative efforts.

Figure 1:
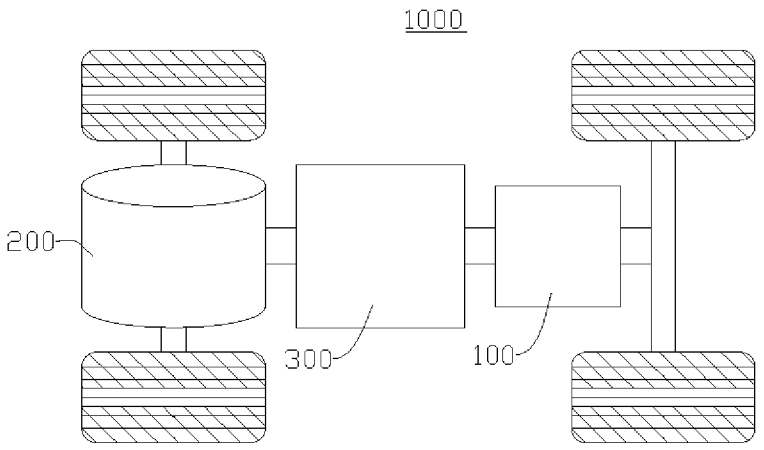
FIG. 1 is a schematic structural view of a vehicle according to some embodiments of the present application.

Numbers: 1000—Vehicle; 100—Battery; 10—Box; 11—Mounting space; 12—First part; 13—Second part; 20—Battery cell; 21—Shell; 211—Case; 2111—First opening; 212—End cover; 213—Second opening; 22—Electrode assembly; 221—Tab; 221*a*—Positive tab; 221*b*—Negative tab; 23—Current collecting member; 23*a*—Positive current collecting member; 23*b*—Negative current collecting member; 231—First connecting part; 2311—Edge of first connecting part; 2312—First surface; 232—Second connecting part; 2321—Hollow part; 2322—Edge of second connecting part; 2323—Step surface; 2324—Second surface; 233—Guide hole; 24—Electrode terminal; 25—Sealing member; 200—Controller; 300—Motor; 2000—Device for manufacturing battery cell; 2100—Provision apparatus; 2200—Assembling apparatus; X—Thickness direction of current collecting member.

DETAILED DESCRIPTION

For the objects, technical solutions and advantages of the examples of the present application to be clearer, the technical solutions in the examples of the present application will be clearly and completely described below in conjunction with the drawings in the examples of the present application, and it is apparent that the described examples are a part of the examples of the present application rather than all the examples. The assembly of the examples of the present application generally described and illustrated in the drawings herein can be arranged and designed in a variety of different configurations.

Therefore, detailed description of the embodiments of the present application provided in the accompanying drawings is not intended to limit the scope of the claimed present application, but only to represent the selected embodiments of the present application. Based on the embodiments in the present application, all other embodiments obtained by those of ordinary skill in the art without creative effort fall within the protection scope of the present application.

It should be noted that in case of no conflicts, the embodiments and the features of the embodiments in the present application may be combined with each other.

It should be noted that similar numbers and letters represent similar items in the following accompanying drawings, so once an item is defined in a drawing, further definition and explanation are not required in subsequent drawings.

In the description of embodiments of the present application, it should be noted that the orientation or positional relationships indicated are based on the orientation or positional relationships shown in the accompanying drawings, or the orientation or positional relationships during use of the applied product that is commonly placed, or the orientation or positional relationships that are commonly understood by those skilled in the art, are only for facilitating the description of the present application and simplifying the description, rather than indicating or implying that the apparatus or element referred to must have a particular orientation or be structured and operated in the particular orientation, and therefore shall not be construed as limiting the present application. In addition, the technical terms "first," "second," "third," etc. are used for descriptive purposes only, and cannot be construed as indicating or implying a relative importance.

At present, from the perspective of the development of the market situation, power batteries are more and more widely used. Power batteries are used in energy storage power source systems such as hydraulic, thermal, wind and solar power stations, in electric vehicles such as electric bicycles, electric motorcycles and electric cars, and also in military equipment, aerospace, and other fields. With continuous expansion of the application field of power batteries, their market demand is also constantly expanding.

The existing battery cell includes a case, an end cover, an electrode assembly, and a current collecting member. The case is provided with an opening, the end cover is used to cover the opening of the case, and the electrode assembly is accommodated in the case. The end cover and a tab are welded to the current collecting member to form an output end for outputting the battery cell. The end cover and the case are made of the same material. To ensure the structural strength of the case, the case may be made of steel. The current collecting member and the tab are made of the same material, for example, the tab is a negative tab, the negative tab is made of copper, and to ensure the welding performance and conductivity between the tab and the current collecting member, the current collecting member is also made of copper. When an end cover made of steel is welded to a current collecting member made of copper, since steel and copper have different thermal coefficients of expansion, in the process of welding steel to copper, copper atoms enter the steel along the molten pool, forming a mechanical mixture. In the cooling process, due to different coefficients of expansion and uneven shrinkage, cracks are generated in the weld seam, thus affecting the airtightness of the battery cell, and causing safety issues in severe cases.

Based on the above considerations, embodiments of the present application provide a battery cell, where a current collecting member of the battery cell includes a first connecting part and a second connecting part which are connected and made of different materials. The first connecting part is made of the same material as a tab and used to be welded to the tab, while the second connecting part is made of the same material as a shell and used to be welded to the shell. Therefore, the second connecting part and the shell have the same coefficient of thermal expansion, and in the process of welding the second connecting part to the shell, atoms from the second connecting part and the shell will enter each other. In the cooling process, due to the same coefficient of expansion, the welding position shrinks evenly, and cracks will not occur at the welding position due to uneven shrinkage, thereby reducing the risk that the airtightness of the battery cell 20 is reduced due to welding, and improving the safety of the battery cell.

The first connecting part of the current collecting member is used to be welded to the tab, and the first connecting part and the tab are made of the same material. Therefore, the first connecting part and the tab have the same coefficient of thermal expansion, and in the process of welding the first connecting part to the tab, atoms from the first connecting part and the tab will enter each other. In the cooling process, due to the same coefficient of expansion, the welding position shrinks evenly, so that the tab and the current collecting member form fine electrical connection and improve the conduction stability.

The battery cell disclosed in embodiments of the present application may be used, but not limited to, in vehicles, ships, aircrafts, or other electrical devices. The power supply system of an electrical apparatus may include the battery cell, the battery, and the like disclosed by the present application, which is beneficial for reducing cracks generated by uneven shrinkage after welding the shell to the current collecting member made of different materials, reducing the risk that the airtightness of the battery cell is reduced due to welding, and improving the safety of the battery cell.

The technical solutions described in embodiments of the present application are suitable for batteries and electrical devices using batteries.

The electrical devices may be, but not limited to, vehicles, mobile phones, portable devices, laptop computers, ships, spacecrafts, electric toys, electric tools, and the like. The vehicles may be fuel vehicles, gas vehicles or new energy vehicles. The new energy vehicles may be all-electric vehicles, hybrid electric vehicles, extended range electric vehicles, or the like. The spacecrafts include aircrafts, rockets, space shuttles, spaceships, and the like. The electric toys include fixed or mobile electric toys, such as game consoles, electric car toys, electric ship toys and electric aircraft toys. The electric tools include electric metal cutting tools, electric grinding tools, electric assembly tools and electric railway tools, such as electric drills, electric grinders, electric wrenches, electric screwdrivers, electric hammers, electric impact drills, concrete vibrators and electric planers. The electrical devices are not specially limited in the embodiments of the present application.

Hereinafter, for convenience of description, the electrical device being a vehicle 1000 is taken as an example for description.

Please refer to FIG. 1, which is a schematic structural view of a vehicle 1000 according to some embodiments of the present application. A battery 100 is arranged in the vehicle 1000, and the battery 100 may be arranged at the bottom or head or tail of the vehicle 1000. The battery 100 may be used to supply power for the vehicle 1000, for example, the battery 100 may be used as an operating power source of the vehicle 1000.

The vehicle 1000 may further include a controller 200 and a motor 300. The controller 200 is used to control the battery 100 to supply power for the motor 300, for example, meet the operating power demand when the vehicle 1000 is started, navigated and driven.

In some embodiments of the present application, the battery 100 not only may serve as an operating power source of the vehicle 1000, but also may serve as a driving power source of the vehicle 1000, thus replacing or partially replacing fuel or natural gas to provide driving power for the vehicle 1000.

Figure 2:
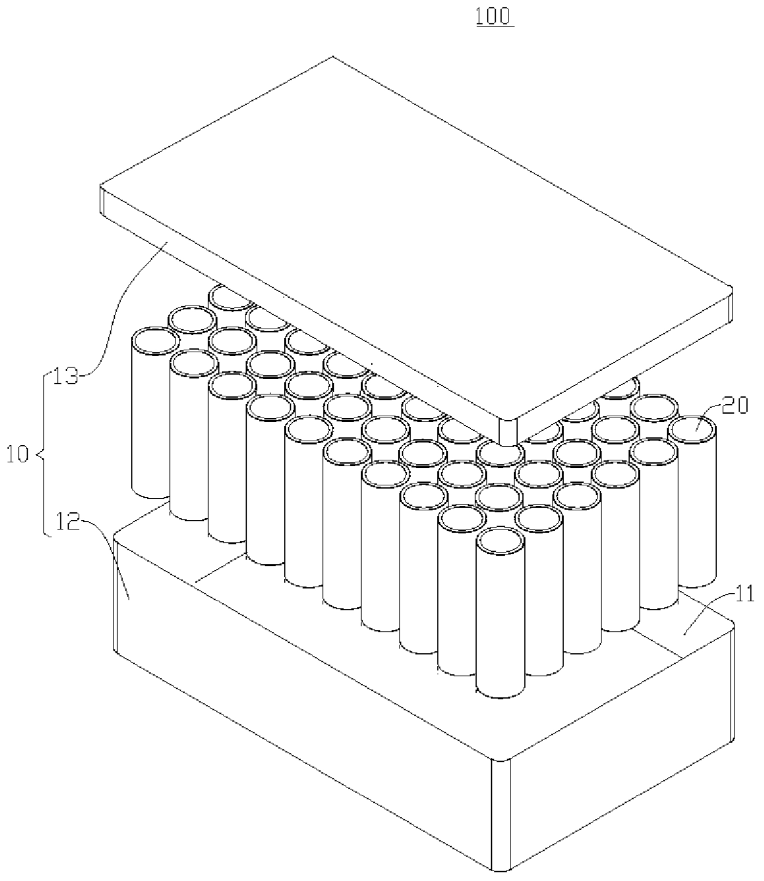
FIG. 2 is a schematic structural view of a battery according to some embodiments of the present application.

Please refer to FIG. 2, which is a schematic structural view of a battery 100 according to some embodiments of the present application. The battery 100 includes a box 10 and a battery cell 20, and the battery cell 20 is accommodated in the box 10.

The box 10 is used to provide a mounting space 11 for the battery cell 20. In some embodiments, the box body 10 may include a first part 12 and a second part 13, and the first part 12 and the second part 13 cover each other to define the mounting space 11 for accommodating the battery cell 20. Of course, the connection between the first part 12 and the second part 13 may be sealed by a sealing member 25 (not shown), and the sealing member 25 may be a sealing ring, a sealant, or the like.

The first part 12 and the second part 13 may be of a variety of shapes of, e.g., a cuboid, and a cylinder. The first part 12 may be a hollow structure with one side open to form a chamber for accommodating the battery cell 20, and the second part 13 may also be a hollow structure with one side open to form a chamber for accommodating the battery cell 20. When the open side of the second part 13 covers the open side of the first part 12, the box 10 with the mounting space 11 is formed. Alternatively, the first part 12 may be a hollow structure with one side open to form a chamber for accommodating the battery cell 20, and the second part 13 may be a plate-like structure. When the second part 13 covers the open side of the first part 12, the box 10 with the mounting space 11 is formed.

One or more battery cells 20 may be arranged in the battery 100. If a plurality of battery cells 20 are arranged, the plurality of battery cells 20 may be connected in series or parallel or in series and parallel, where the parallel-series connection means that the plurality of battery cells 20 are connected in series and parallel. The plurality of battery cells 20 may be directly connected in series or parallel or in series and parallel, and then the plurality of battery cells 20 connected into a whole may be accommodated in the box 10. Alternatively, the plurality of battery cells 20 may be connected in series or parallel or in series and parallel to form a battery module, and then a plurality of battery modules may be connected in series or parallel or in series and parallel to form a whole and accommodated in the box 10. The battery cell 20 may be in the shape of a cylinder, a flat body, a cuboid, or the like. FIG. 2 illustrates an example of the battery cell 20 in a cylindrical shape.

In some embodiments, the battery 100 may further include a bus component (not shown), and the plurality of battery cells 20 may be electrically connected through the bus component to realize series, parallel, or parallel-series connection of the plurality of battery cells 20.

Figure 3:
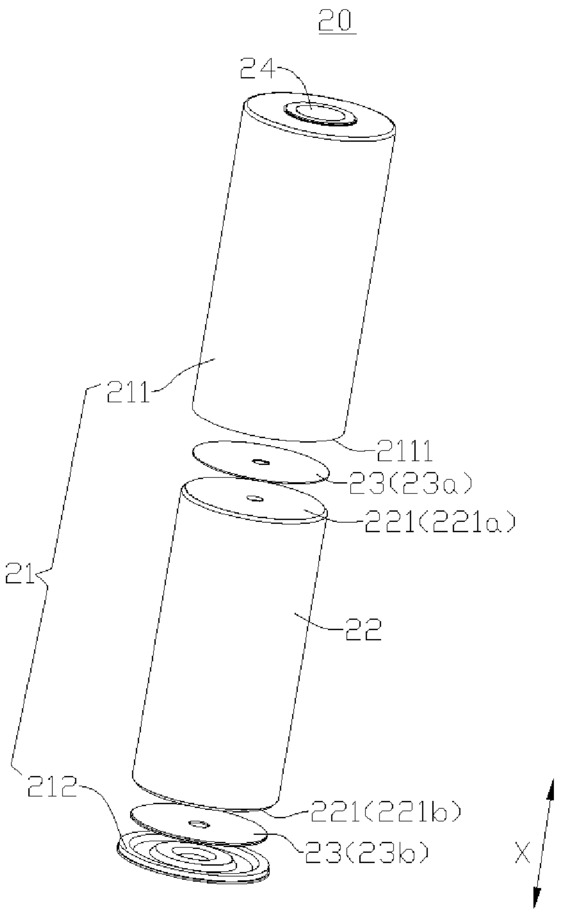
FIG. 3 is an exploded view of a battery cell according to some embodiments of the present application.

Please refer to FIG. 3, which is a schematic structural view of a battery cell 20 according to some embodiments of the present application. The battery cell 20 includes a shell 21, an electrode assembly 22 and two current collecting members 23. The electrode assembly 22 is accommodated in the shell 21.

The shell 21 may be of a variety of shapes of, e.g., a cylinder and a cuboid. The shape of the shell 21 may be determined according to the specific shape of the electrode assembly 22. For example, if the electrode assembly 22 is a cylindrical structure, the shell 21 may also be a cylindrical structure, and if the electrode assembly 22 is a cuboid structure, the shell 21 may also be a cuboid structure. FIG. 3 illustrates an example where the shell 21 and electrode assembly 22 are cylindrical.

The shell 21 may be made of various materials, e.g., copper, iron, aluminum, stainless steel, and aluminum alloy, which is not specifically limited in embodiments of the present application.

The electrode assembly 22 may include a positive electrode plate (not shown), a negative electrode plate (not shown) and a separator (not shown). The electrode assembly 22 may be a wound structure formed by winding a positive electrode plate, a separator and a negative electrode plate, or may be a stacked structure formed by stacking a positive electrode plate, a separator and a negative electrode plate. The electrode assembly 22 further includes a positive tab 221*a* (not shown) and a negative tab 221*b* (not shown). The positive tab 221*a* may be a positive current collector of which the positive electrode plate is not coated with a positive active material layer, and the negative tab 221*b* may be a negative current collector of which the negative electrode plate is not coated with a negative active material layer. As shown in FIG. 3, the electrode assembly 22 is cylindrical, and the positive tab 221*a* and the negative tab 221*b* are arranged at the axial two ends of the electrode assembly 22.

One of the two current collecting members 23 is the positive current collecting member 23*a*, and the other is the negative current collecting member 23*b*. The negative tab 221*b* is electrically connected to the shell 21 through the negative current collecting member 23*b* to form a negative output end for outputting the electrical energy of the battery cell 20. The positive tab 221*a* is electrically connected to an electrode terminal 24 formed at one end of the shell 21 through the positive current collecting member 23*a*, so that the electrode terminal 24 forms a positive output end for outputting the electrical energy of the battery cell 20. The electrode terminal 24 is connected to the shell 21 through an insulating sealing member 25 to avoid a short circuit between the shell 21 and the electrode terminal 24.

Figure 4:
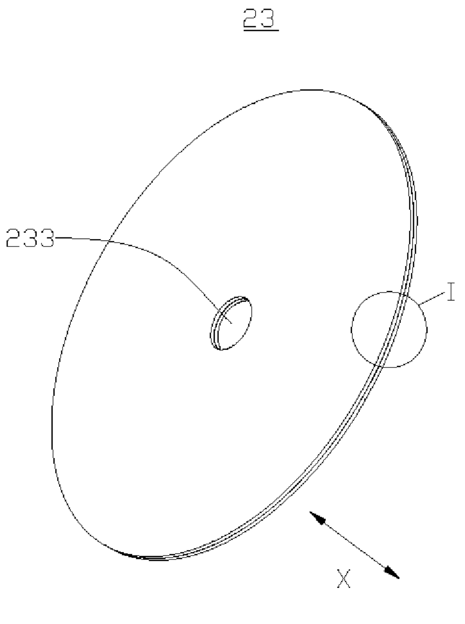
FIG. 4 is a schematic structural view of a current collecting member (with a first connecting part and a second connecting part stacked) according to some embodiments of the present application.
Figure 5:
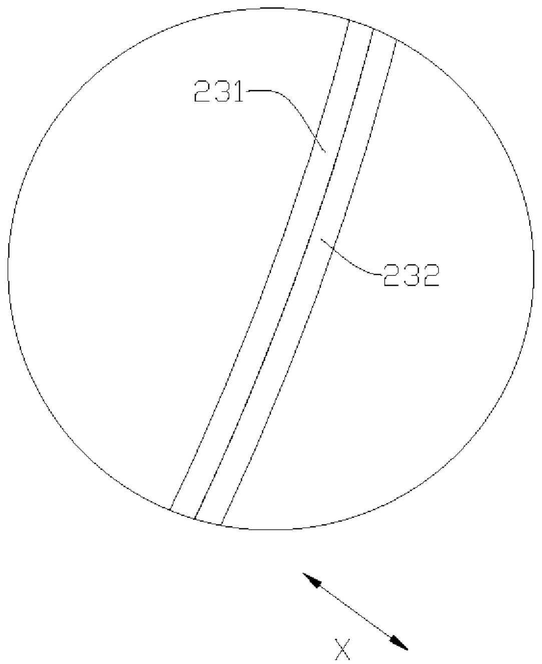
FIG. 5 is an enlarged view of part I in FIG. 4.

Please refer to FIGS. 3, 4 and 5, where FIG. 4 is a schematic structural view of a current collecting member 23 provided in some embodiments of the present application, and FIG. 5 is an enlarged view of part I in FIG. 4. The battery cell 20 includes a shell 21, an electrode assembly 22, and a current collecting member 23. The electrode assembly 22 is accommodated in the shell 21, and the electrode assembly 22 is provided with a tab 221. The current collecting member 23 includes a first connecting part 231 and a second connecting part 232 which are connected, the first connecting part 231 is used to be welded to the tab 221, and the second connecting part 232 is used to be welded to the shell 21 to achieve electrical connection between the tab 221 and the shell 21. The first connecting part 231 and the second connecting part 232 are made of different materials, the first connecting part 231 and the tab 221 are made of the same material, and the second connecting part 232 and the shell 21 are made of the same material.

The tab 221 may be a positive tab 221*a* or a negative tab 221*b*. When the tab 221 is the positive tab 221*a*, the current collecting member 23 is the positive current collecting member 23*a*, and the positive tab 221*a* may be made of aluminum. Correspondingly, the first connecting part 231 of the current collecting member 23 to be welded to the positive tab 221*a* is also made of aluminum. When the tab 221 is the negative tab 221*b*, the current collecting member 23 is the negative current collecting member 23*b*, and the negative tab 221*b* may be made of copper. Correspondingly, the first connecting part 231 of the current collecting member 23 to be welded to the negative tab 221*b* is also made of copper.

The second connecting part 232 may be made of steel, and the like. The second connecting part 232 should be made of a material that makes the shell 21 have the strength meeting the operating requirements. For example, the second connecting part 232 is made steel, and correspondingly, the shell 21 is made of steel.

The first connecting part 231 and the second connecting part 232 may be connected as a whole structure by welding, bonding, or other means.

To facilitate circulation of an electrolyte solution and enable the electrode assembly 22 to be fully wetted, a guide hole 233 penetrating through the current collecting member 23 is formed in the current collecting member 23 along the thickness direction X of the current collecting member.

The second connecting part 232 of the current collecting member 23 is used to be welded to the shell 21, and the second connecting part 232 and the shell 21 are made of the same material. Therefore, the second connecting part 232 and the shell 21 have the same coefficient of thermal expansion, and in the process of welding the second connecting part 232 to the shell 21, atoms from the second connecting part 232 and the shell 21 will enter each other. In the cooling process, due to the same coefficient of expansion, the welding position shrinks evenly, and cracks will not occur at the welding position due to uneven shrinkage, thereby reducing the risk that the airtightness of the battery cell 20 is reduced due to welding, and improving the safety of the battery cell 20. The first connecting part 231 of the current collecting member 23 is used to be welded to the tab 221, and the first connecting part 231 and the tab 221 are made of the same material. Therefore, the first connecting part 231 and the tab 221 have the same coefficient of thermal expansion, and in the process of welding the first connecting part 231 to the tab 221, atoms from the first connecting part 231 and the tab 221 will enter each other. In the cooling process, due to the same coefficient of expansion, the welding position shrinks evenly, so that the tab 221 and the current collecting member 23 form fine electrical connection and improve the conduction stability.

The relative position relationship between the first connecting part 231 and the second connecting part 232 may be in various forms. For example, as shown in FIGS. 4 and 5, in some embodiments, the first connecting part 231 and the second connecting part 232 are stacked along the thickness direction X of the current collecting member, and the first connecting part 231 is arranged on one side of the second connecting part 232 facing the electrode assembly 22.

The thickness direction X of the current collecting member is consistent with the axial direction of the electrode assembly 22. Along the thickness direction X of the current collecting member, the side of the first connecting part 231 not facing the electrode assembly 22 is connected to the side of the second connecting part 232 facing the electrode assembly 22, so that the first connecting part 231 is arranged on the side of the second connecting part 232 facing the electrode assembly 22.

The first connecting part 231 and the second connecting part 232 are stacked along the thickness direction X of the current collecting member, and the first connecting part 231 is arranged on the side of the second connecting part 232 facing the electrode assembly 22. In other words, along the thickness direction X of the current collection member, the first connecting part 231 is arranged close to the tab 221, and the second connecting part 232 is arranged close to the shell 21, facilitating welding the first connecting part 231 to the tab 221, and welding the second connecting part 232 to the shell 21.

In embodiments where the first connecting part 231 and the second connecting part 232 are stacked along the thickness direction X of the current collecting member, and the first connecting part 231 is arranged on the side of the second connecting part 232 facing the electrode assembly 22, such arrangement results in a larger size of the current collecting member 23 along the thickness direction. The first connecting part 231 is welded to the tab 221 generally through external penetration welding, which requires the heat from the external welding to pass through the second connecting part 232 and the first connecting part 231 in sequence to reach the tab 221 to weld the first connecting part 231 to the tab 221. This process has a long heat transfer path and low efficiency.

Figure 6:
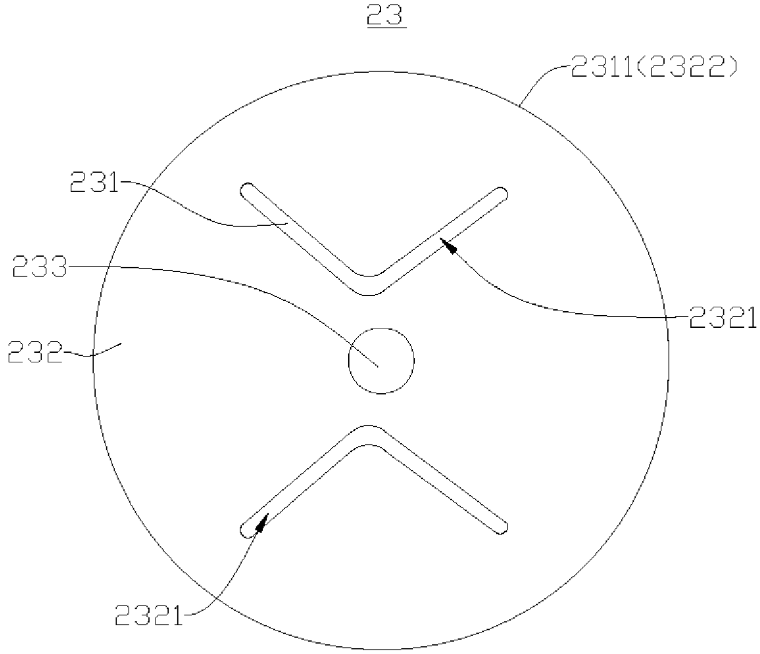
FIG. 6 is a schematic structural view of a current collecting member (with a first connecting part and a second connecting part stacked) according to other embodiments of the present application.
Figure 7:
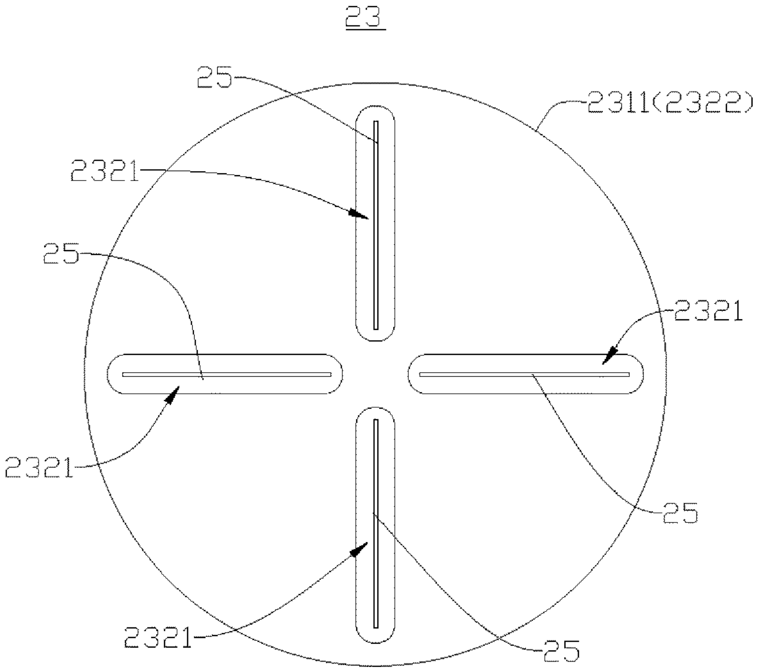
FIG. 7 is a schematic structural view of a current collecting member (with a first connecting part and a second connecting part stacked) according to still other embodiments of the present application.

Based on this, as shown in FIGS. 6 and 7, FIG. 6 is a schematic structural vie of a current collecting member 23 according to other embodiments of the present application, and FIG. 7 is a schematic structural view of a current collecting member 23 according to still other embodiments of the present application. In some embodiments, the second connecting part 232 is provided with hollow parts 2321 penetrating through the second connecting part 232 along the thickness direction; and a welding area is formed at a position of the first connecting part 231 corresponding to the hollow parts 2321, and is used to be welded to the tab 221.

The thickness direction refers to the thickness direction X of the current collecting member, and is also the stacking direction of the first connecting part 231 and the second connecting part 232. The first connecting part 231 covers the hollow parts 2321 on the side of the second connecting part 232 facing the electrode assembly 22, and the first connecting part 231 can be seen from the hollow parts 2321 on the side of the second connecting part 232 not facing the electrode assembly 22. Therefore, a welding mark between the first connecting part 231 and the tab 221 can be formed in the welding area corresponding to the hollow parts 2321 on the side of the second connecting part 232 not facing the electrode assembly 22, and the shape of the welding mark may match the shape of the hollow parts 2321.

The hollow parts 2321 may be circular holes, square holes, and other forms of holes penetrating through the second connecting part 232 on both sides along the thickness direction X of the current collecting member. As shown in FIG. 6, the hollow parts 2321 are V-shaped structures penetrating through the second connecting part 232 on both sides along the thickness direction X of the current collecting member. FIG. 7 shows the structural form of the hollow parts 2321 being strip holes, where four strip-hole hollow parts 2321 are evenly spaced along the circumference of the guide hole 233.

One or a plurality of hollow parts 2321 may be formed. The phrase "a plurality of" refers to two or more than two. FIG. 6 shows the case where two hollow parts 2321 are formed. The number of hollow parts 2321 in FIG. 7 is four. As shown in FIG. 7, in some embodiments, a guide hole 233 may not be formed in the current collecting member 23, so the current collecting member 23 may be used as an end cover 212. After the first connecting part 231 is welded to the tab 221, a sealing member 25 may be arranged at the hollow parts 2321 to improve the airtightness of the battery cell 20 when the current collecting member 23 is used as the end cover 212.

The second connecting part 232 is provided with the hollow parts 2321, and the welding area is formed at the position of the first connecting part 231 corresponding to the hollow parts 2321. Therefore, when the first connecting part 231 is welded to the tab 221, the welding heat is transferred through the first connecting part 231 in the welding area, without the need of being transferred through the second connecting part 232 before being transferred through the first connecting part 231, thereby shortening the transfer path of the welding heat, facilitating welding, and improving the welding quality and efficiency.

Figure 8:
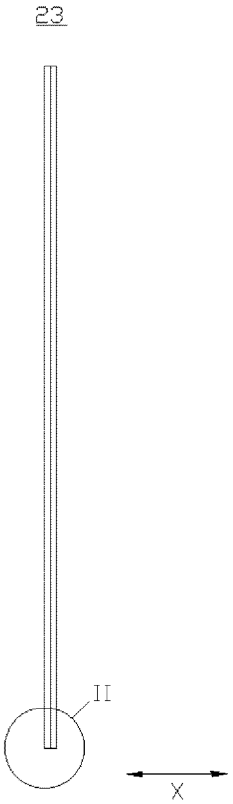
FIG. 8 is a left view of the current collecting member in FIG. 7.
Figure 9:
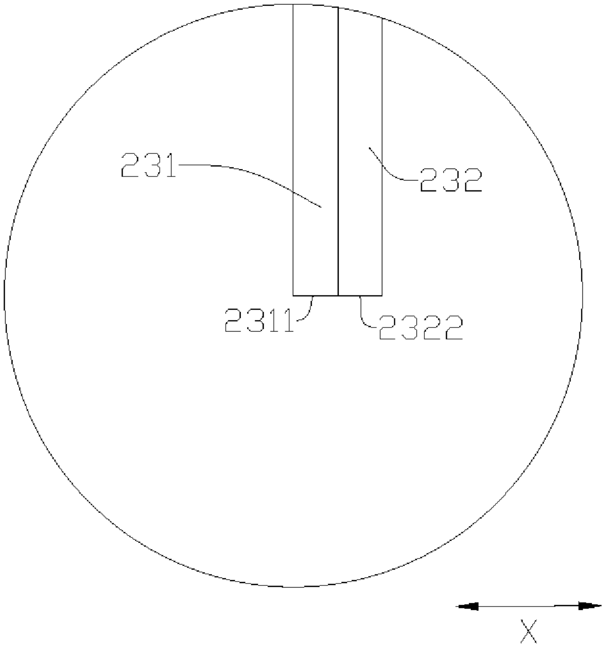
FIG. 9 is an enlarged view of part II in FIG. 8.

Please refer to FIGS. 7, 8, and 9, where FIG. 8 is a left view of the current collecting member 23 in FIG. 7, and FIG. 9 is an enlarged view of part II in FIG. 8. In some embodiments, the edge 2322 of the second connecting part is flush with the edge 2311 of the first connecting part.

The edge 2322 of the second connecting part being flush with the edge 2311 of the first connecting part can be understood as that the projection of the edge 2322 of the second connecting part completely coincides with the projection of the edge 2311 of the first connecting part along the thickness direction X of the current collecting member.

The edge 2322 of the second connecting part is flush with the edge 2311 of the first connecting part, making the structure of the current collecting member 23 more regular, facilitating installing the current collecting member 23 and welding the current collecting member 23 to the tab 221 and the shell 21, and also reducing the risk of interference of the current collecting member 23 with other structures of the battery cell 20.

Please refer to FIGS. 7, 8, and 9. In some embodiments, the first connecting part 231 and the second connecting part 232 are coaxially arranged and have equal radii.

Both the first connecting part 231 and the second connecting part 232 are circular, so the formed current collecting member 23 is circular. Both the first connecting part 231 and the second connecting part 232 may also be arranged coaxially with the electrode assembly 22. The first connecting part 231 and the second connecting part 232 have the equal radii, so the formed current collecting member 23 is an isodiametric structure along the axial direction. The edge 2311 of the first connecting part is the outer circumference of the first connecting part 231, and the edge 2322 of the second connecting part is the outer circumference of the second connecting part 232.

The first connecting part 231 and the second connecting part 232 are arranged coaxially, facilitating stacked arrangement of the first connecting part 231 and the second connecting part 232. The first connecting part 231 and the second connecting part 232 have equal radii, so that the edge 2322 of the second connecting part is flush with the edge 2311 of the first connecting part, making the structure of the current collecting member 23 more regular, facilitating installing the current collecting member 23 and welding the current collecting member 23 to the tab 221 and the shell 21, and also reducing the risk of interference of the current collecting member 23 with other structures of the battery cell 20.

Figure 10:
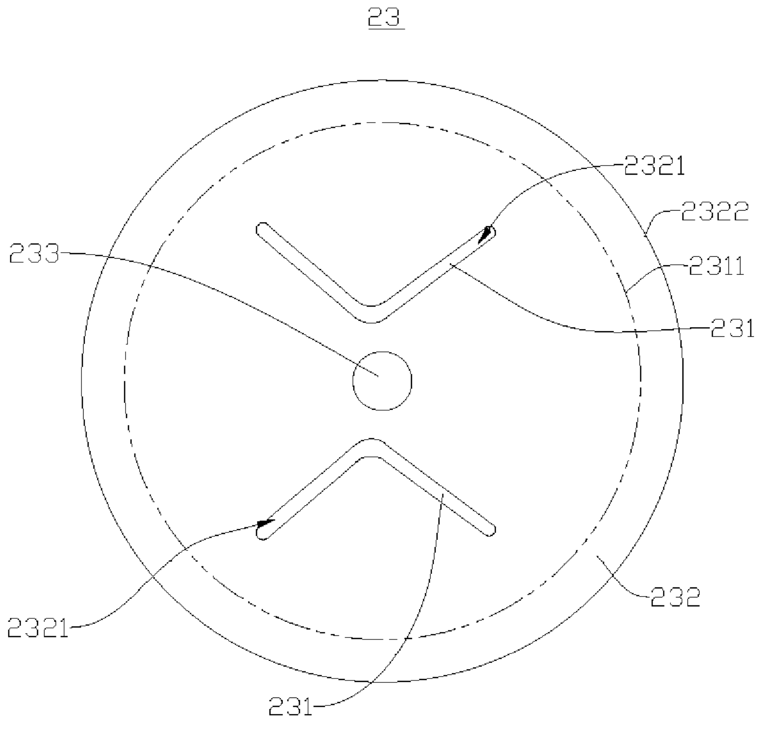
FIG. 10 is a front view of a current collecting member (with a first connecting part and a second connecting part stacked) according to still other embodiments of the present application.
Figure 11:
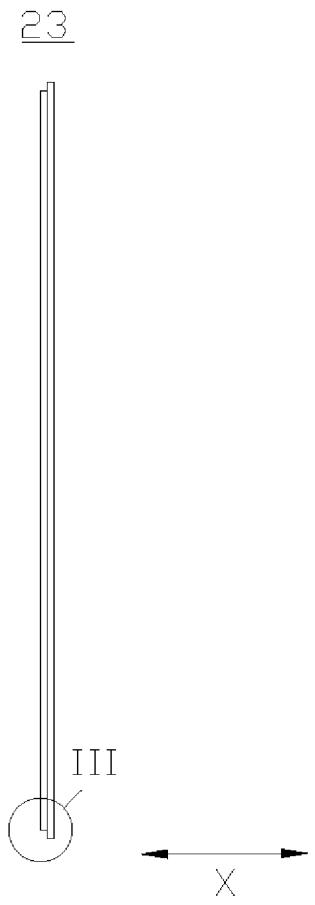
FIG. 11 is a left view of the current collecting member as shown in FIG. 10.
Figure 12:
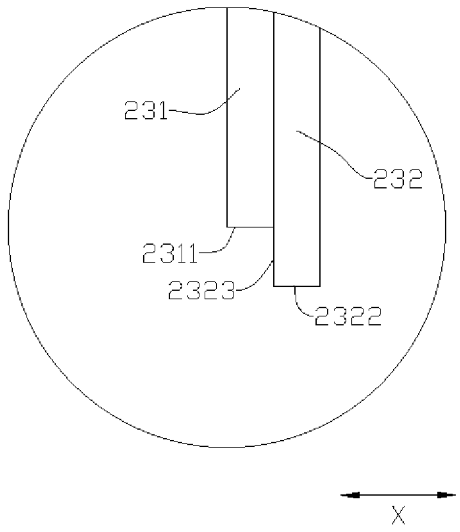
FIG. 12 is an enlarged view of part III in FIG. 11.

Please refer to FIGS. 10, 11, and 12, where FIG. 10 is a front view of a current collecting member 23 according to still other embodiments of the present application, FIG. 11 is a left view of the current collecting member 23 shown in FIG. 10, and FIG. 12 is an enlarged view of part III in FIG. 11. In some embodiments, the edge 2322 of the second connecting part extends the edge 2311 of the first connecting part.

The edge 2322 of the second connecting part extending the edge 2311 of the first connecting part can be understood as that the projection of the edge 2322 of the second connecting part along the thickness direction X of the current collecting member encloses the periphery of the projection of the edge 2311 of the first connecting part along the thickness direction X of the current collecting member.

The edge 2322 of the second connecting part extends the edge 2311 of the first connecting part, so that the portion of the second connecting part 232 extending the first connecting part 231 forms a step surface 2323. The portion of the second connecting part 232 extending the first connecting part 231 may be welded to the shell 21, facilitating welding the second connecting part 232 to the shell 21, and also reducing the effect of heat generated during welding the second connecting part 232 to the shell 21 on the first connecting part 231 and the tab 221.

In some embodiments, the first connecting part 231 and the second connecting part 232 are arranged coaxially, and the radius of the second connecting part 232 is greater than the radius of the first connecting part 231.

Both the first connecting part 231 and the second connecting part 232 are circular, so the formed current collecting member 23 is circular. Both the first connecting part 231 and the second connecting part 232 may also be arranged coaxially with the electrode assembly 22. The radius of the second connecting part 232 is greater than the radius of the first connecting part 231, so that the formed current collecting member 23 is a stepped axis structure along the axial direction.

The first connecting part 231 and the second connecting part 232 are arranged coaxially, facilitating stacked arrangement of the first connecting part 231 and the second connecting part 232. The radius of the second connecting part 232 is greater than the radius of the first connecting part 231, so that a step surface 2323 is formed between the first connecting part 231 and the second connecting part 232. The portion of the second connecting part 232 extending the first connecting part 231 may be welded to the shell 21, facilitating welding the second connecting part 232 to the shell 21, and also reducing the effect of heat generated during welding the second connecting part 232 to the shell 21 on the first connecting part 231 and the tab 221.

Figure 13:
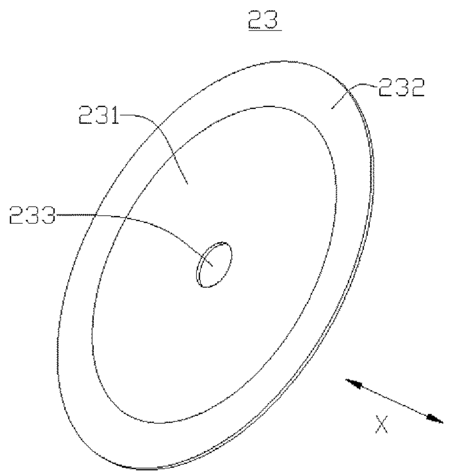
FIG. 13 is a schematic structural view of a current collecting member (with a second connecting part enclosing the periphery of a first connecting part) according to still other embodiments of the present application.
Figure 14:
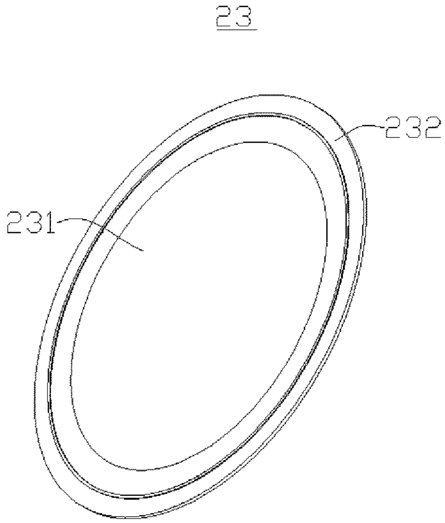
FIG. 14 is a schematic structural view of a current collecting member (with a second connecting part enclosing the periphery of a first connecting part) according to still other embodiments of the present application.
Figure 15:
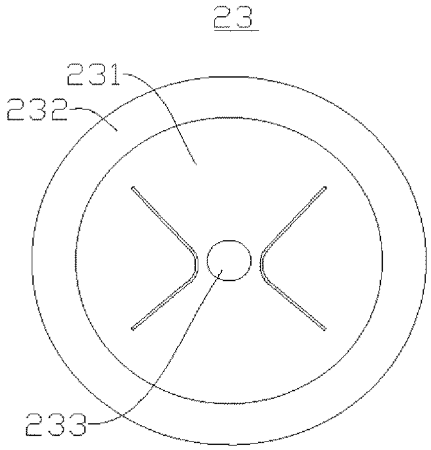
FIG. 15 is a schematic structural view of a current collecting member (with a second connecting part enclosing the periphery of a first connecting part) according to still other embodiments of the present application.

For example, as shown in FIGS. 13, 14, and 15, FIG. 13 is a schematic structural view of a current collecting member 23 according to still some embodiments of the present application, FIG. 14 is a schematic structural view of a current collecting member 23 according to other embodiments of the present application, and FIG. 15 is a schematic structural view of a current collecting member 23 according to still other embodiments of the present application. In some embodiments, the second connecting part 232 encloses the periphery of the first connecting part 231.

The second connecting part 232 is circular, and the inner edge of the second connecting part 232 is connected to the outer edge of the first connecting part 231 by welding, bonding, or other means, so that the second connecting part 232 encloses the periphery of the first connecting part 231. The second connecting part 232 forms the outer ring of the current collecting member 23, and the first connecting part 231 forms the inner ring of the current collecting member 23.

The second connecting part 232 encloses the periphery of the first connecting part 231, so that the outer ring of the current collecting member 23 is welded to the shell 21, while the inner ring of the current collecting member 23 is welded to the tab 221, facilitating welding the current collecting member 23 to the shell 21 and the tab 221, and also reducing the risk of mutual effect between the welding position of the first connecting part 231 to the tab 221 and the welding position of the second connecting part 232 to the shell 21.

Figure 16:
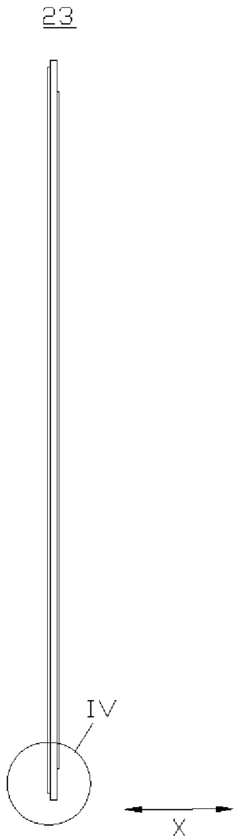
FIG. 16 is a left view of a current collecting member (with a second connecting part enclosing the periphery of a first connecting part) according to still other embodiments of the present application.
Figure 17:
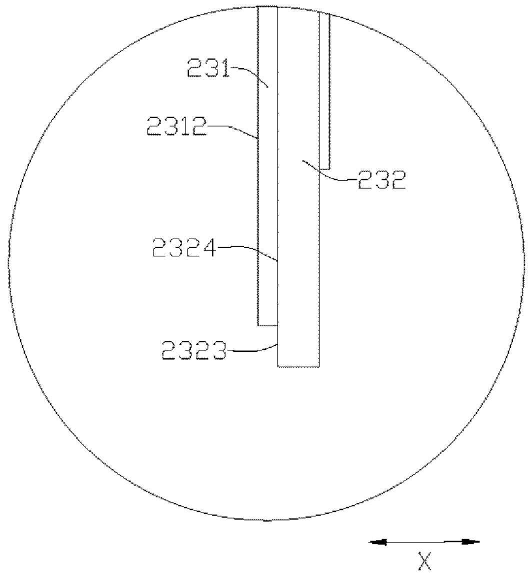
FIG. 17 is an enlarged view of part IV in FIG. 16.

Please refer to FIGS. 16 and 17, where FIG. 16 is a left view of a current collecting member 23 according to still other embodiments of the present application, and FIG. 17 is an enlarged view of part IV in FIG. 16. In some embodiments, the first connecting part 231 is provided with a first surface 2312 facing the electrode assembly 22, the second connecting part 232 is provided with a second surface 2324 facing the electrode assembly 22, the first surface 2312 is closer to the electrode assembly 22 than the second surface 2324, and the first surface 2312 abuts against the tab 221.

The first surface 2312 being closer to the electrode assembly 22 than the second surface 2324 can be understood as that the first connecting part 231 protruding in the direction closer to the electrode assembly 22 relative to the second connecting part 232. Of course, the first surface 2312 and the second surface 2324 may also be coplanar.

The surface of the first connecting part 231 not facing the electrode assembly 22 and the surface of the second connecting part 232 not facing the electrode assembly 22 may be coplanar. The surface of the first connecting part 231 not facing the electrode assembly 22 and the surface of the second connecting part 232 not facing the electrode assembly 22 may also be noncoplanar, for example, the surface of the first connecting part 231 not facing the electrode assembly 22 is closer to the electrode assembly 22 than the surface of the second connecting part 232 not facing the electrode assembly 22. Or, the surface of the first connecting part 231 not facing the electrode assembly 22 is farther from the electrode assembly 22 than the surface of the second connecting part 232 not facing the electrode assembly 22.

The first surface 2312 of the first connecting part 231 facing the electrode assembly 22 is closer to the electrode assembly 22 than the second surface 2324 of the second connecting part 232 facing the electrode assembly 22, facilitating welding after the first surface 2312 abuts against the tab 221 to form stable electrical connection.

Please refer to FIG. 3, in some embodiments, the current collecting member 23 is arranged in the shell 21; the shell 21 includes a case 211 and an end cover 212; the case 211 is provided with a first opening 2111; the end cover 212 is used to cover the first opening 2111; and the end cover 212 is used to be connected with the second connecting part 232.

An electrode terminal 24 is formed at the other end of the case 211 opposite to the first opening 2111, and the positive tab 221*a* of the electrode assembly 22 is electrically connected through a positive current collecting member 23*a*. The electrode terminal 24 and the second connecting part 232 of the positive current collecting member 23*a* are made of the same material. The end cover 212 may be welded to the case 211 for sealing.

The end cover 212 is electrically connected to the negative tab 221*b* through a negative current collecting member 23*b*. The end cover 212 and the case 211 are made of the same material. After the electrode assembly 22 with the negative current collecting member 23*b* welded is accommodated in the case 211, the first opening 2111 is covered with the end cover 212, and the end cover 212 is welded to the second connecting part 232 of the negative current collecting member 23*b*. The end cover 212 may be electrically connected to or insulated from the case 211.

The end cover 212 of the shell 21 being used to be welded to the second connecting part 232 can match the assembly process of the battery cell 20 and facilitate assembling the battery cell 20.

Figure 18:
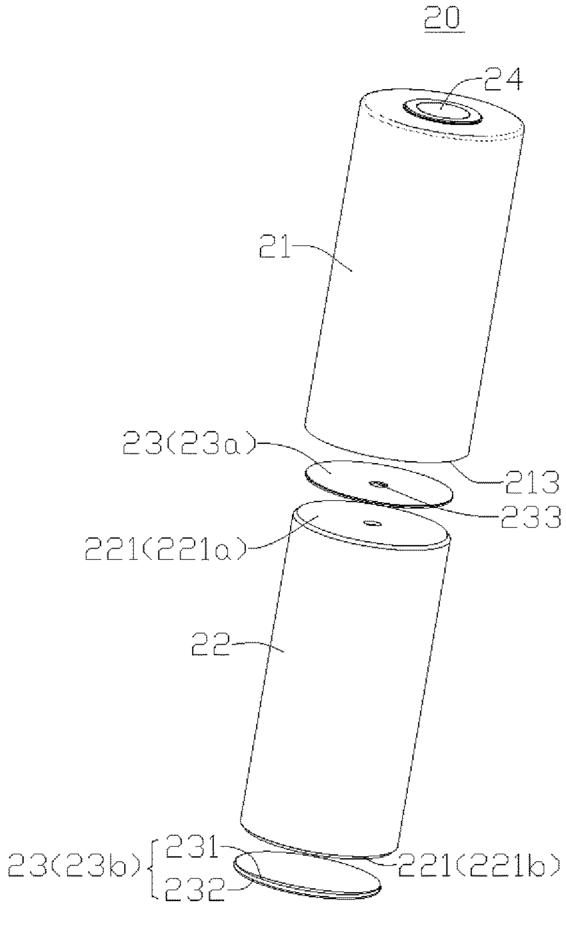
FIG. 18 is an exploded view of a battery cell according to still other embodiments of the present application.

Please refer to FIG. 18, which is an exploded view of a battery cell 20 according to other embodiments of the present application. In some embodiments, the shell 21 is provided with a second opening 213, and the current collecting member 23 is used to cover the second opening 213.

The current collecting member 23 is equivalent to the end cover 212, so that an end cover 212 is not needed to cover the second opening 213. In embodiments where the current collecting member 23 is used as an end cover 212, a guide hole 233 cannot be formed in the current collecting member 23.

The current collecting member 23 is used to cover the second opening 213 of the shell 21, that is, the current collecting member 23 can output the electrical energy of the battery cell 20 and also form a space with the shell 21 to accommodate the electrode assembly 22, achieving versatility, reducing the number of structural components of the battery cell 20, and reducing the difficulty of assembly.

In some embodiments, the first connecting part 231 is made of copper; and/or, the second connecting part 232 is made of steel.

The first connecting part 231 is made of copper, and the second connecting part 232 may be made of materials other than steel. Or, the second connecting part 232 is made of steel, and the first connecting part 231 is made of materials other than copper. Or, in a case that the first connecting part 231 is made of copper, the second connecting part 232 is made of steel.

Of course, the first connecting part 231 and the second connecting part 232 should be selected according to actual needs, so that the battery cell 20 can meet requirements of practical applications.

The first connecting part 231 is made of copper, so the tab 221 is also made of copper to ensure preferable conductivity between the tab 221 and the first connecting part 231. The second connecting part 232 is made of steel, so the shell 21 is also made of steel to make the shell 21 have preferable strength.

As shown in FIG. 18, in some embodiments, the battery cell 20 is cylindrical.

Of course, the battery cell 20 may also be in other forms, such as a square shell battery 100.

The battery cell 20 is cylindrical, and has the advantages of high capacity, long cycle life, a wide range of operating environment temperature, and the like.

Embodiments of the present application further provide a battery 100, including any of the battery cells 20 according to the above embodiments.

The shell 21 of the battery cell 20 is welded to the second connecting part 232 made of the same material as the shell.

In the cooling process after welding, due to the same coefficient of expansion, the welding position shrinks evenly, and cracks will not occur at the welding position due to uneven shrinkage, thereby reducing the risk that the airtightness of the battery cell 20 is reduced due to welding, improving the safety of the battery cell 20, and further improving the safety of the battery 100.

Embodiments of the present application further provide an electrical device, including the battery 100 according to the above embodiments.

The shell 21 of the battery cell 20 of the battery 100 is welded to the second connecting part 232 made of the same material as the shell. In the cooling process after welding, due to the same coefficient of expansion, the welding position shrinks evenly, and cracks will not occur at the welding position due to uneven shrinkage, thereby reducing the risk that the airtightness of the battery cell 20 is reduced due to welding, improving the safety of the battery cell 20, further improving the safety of the battery 100, and even further improving electrical safety.

Figure 19:
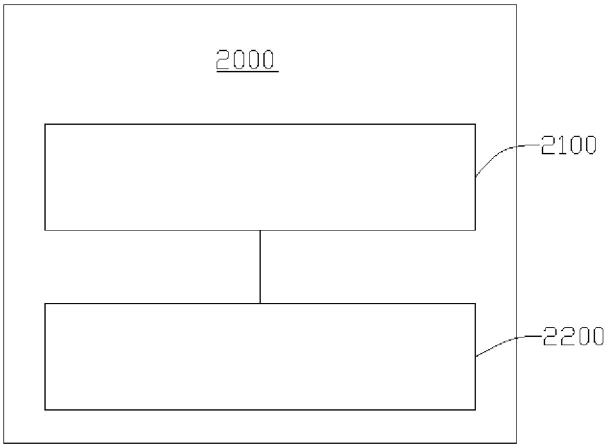
FIG. 19 is a schematic structural view of a device for manufacturing a battery cell according to some embodiments of the present application.

As shown in FIG. 19, embodiments of the present application further provide a device 2000 for manufacturing a battery cell, including a provision apparatus 2100 and an assembling apparatus 2200. The provision apparatus 2100 is configured to provide a shell 21, an electrode assembly 22, and a current collecting member 23, and the electrode assembly 22 is provided with a tab 221. The current collecting member 23 includes a first connecting part 231 and a second connecting part 232 which are connected, the first connecting part 231 is used to be welded to the tab 221, and the second connecting part 232 is used to be welded to the shell 21 to achieve electrical connection between the tab 221 and the shell 21. The first connecting part 231 and the second connecting part 232 are made of different materials, the first connecting part 231 and the tab 221 are made of the same material, and the second connecting part 232 and the shell 21 are made of the same material. The assembling apparatus 2200 is configured to accommodate the electrode assembly 22 in the shell 21, weld the first connecting part 231 to the tab 221, and weld the second connecting part 232 to the shell 21.

Figure 20:
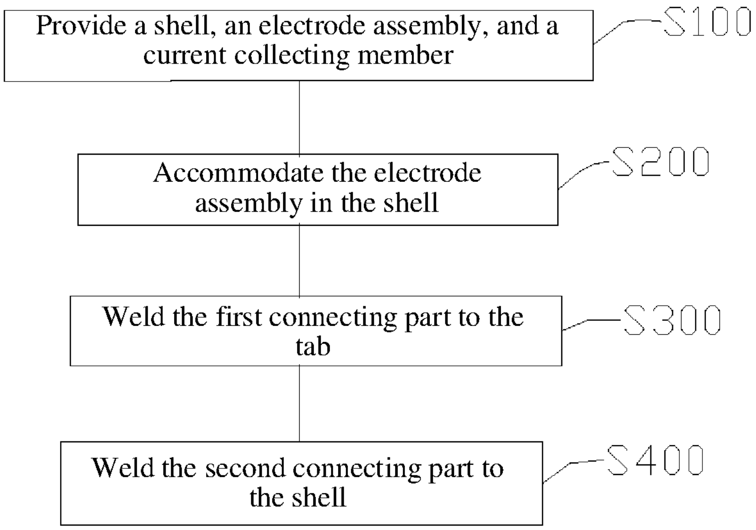
FIG. 20 is a flow chart of a method for manufacturing a battery cell according to some embodiments of the present application.

As shown in FIG. 20, embodiments of the present application further provide a method for manufacturing a battery cell 20, including the following steps:

S100: providing a shell 21, an electrode assembly 22, and a current collecting member 23, where the electrode assembly 22 is provided with a tab 221; the current collecting member 23 includes a first connecting part 231 and a second connecting part 232 which are connected, the first connecting part 231 is used to be welded to the tab 221, and the second connecting part 232 is used to be welded to the shell 21 to achieve electrical connection between the tab 221 and the shell 21; and the first connecting part 231 and the second connecting part 232 are made of different materials, the first connecting part 231 and the tab 221 are made of the same material, and the second connecting part 232 and the shell 21 are made of the same material.

S200: accommodating the electrode assembly 22 in the shell 21;

S300: welding the first connecting part 231 to the tab 221; and

S400: welding the second connecting part 232 to the shell 21.

The execution sequence of S200 and S300 is not limited. For example, the first connecting part 231 and the tab 221 can be welded together and then accommodated in the shell 21, that is, S300 can be executed before S200. Of course, S200 may also be performed before S300.

The second connecting part 232 of the current collecting member 23 is used to be welded to the shell 21, and the second connecting part 232 and the shell 21 are made of the same material. Therefore, the second connecting part 232 and the shell 21 have the same coefficient of thermal expansion, and in the process of welding the second connecting part 232 to the shell 21, atoms from the second connecting part 232 and the shell 21 will enter each other. In the cooling process, due to the same coefficient of expansion, the welding position shrinks evenly, and cracks will not occur at the welding position due to uneven shrinkage, thereby reducing the risk that the airtightness of the battery cell 20 is reduced due to welding, and improving the safety of the battery cell 20. The first connecting part 231 of the current collecting member 23 is used to be welded to the tab 221, and the first connecting part 231 and the tab 221 are made of the same material. Therefore, the first connecting part 231 and the tab 221 have the same coefficient of thermal expansion, and in the process of welding the first connecting part 231 to the tab 221, atoms from the first connecting part 231 and the tab 221 will enter each other. In the cooling process, due to the same coefficient of expansion, the welding position shrinks evenly, so that the tab 221 and the current collecting member 23 form fine electrical connection and improve the conduction stability.

Embodiments of the present application provide a cylindrical battery cell, including a shell 21, an electrode assembly 22, and a current collecting member 23. The electrode assembly 22 is accommodated in the shell 21, and the electrode assembly 22 is provided with a tab 221 (negative tab 221*b*). The current collecting member 23 includes a first connecting part 231 and a second connecting part 232 which are connected, the first connecting part 231 is used to be welded to the negative tab 221*b*, and the second connecting part 232 is used to be welded to the shell 21 to achieve electrical connection between the tab 221 and the shell 21. The first connecting part 231 and the second connecting part 232 are made of different materials, the first connecting part 231 and the tab 221 are made of the same material, and the second connecting part 232 and the shell 21 are made of the same material. The first connecting part 231 and the tab 221 are made of copper, and the second connecting part 232 and the shell 21 are made of steel.

Therefore, the second connecting part 232 and the shell 21 have the same coefficient of thermal expansion. In the cooling process after welding, due to the same coefficient of expansion, the welding position shrinks evenly, and cracks will not occur at the welding position due to uneven shrinkage, thereby reducing the risk that the airtightness of the battery cell 20 is reduced due to welding, and improving the safety of the battery cell 20. The first connecting part 231 and the tab 221 are made of the same material. Therefore, the first connecting part 231 and the tab 221 have the same coefficient of thermal expansion. In the cooling process after welding, due to the same coefficient of expansion, the welding position shrinks evenly, so that the tab 221 and the current collecting member 23 form fine electrical connection and improve the conduction stability.

The above are only preferred embodiments of the present application, and are not intended to limit the present application. For those skilled in the art, the present application may have various modifications and changes. Any modifications, equivalent replacements, and improvements made within the spirit and principle of the present application are included in the protection scope of the present application.

What is claimed is:

1. A battery cell, comprising:

a shell;

an electrode assembly, accommodated in the shell, and provided with a tab; and a current collecting member, comprising a first connecting part and a second connecting part which are connected, the first connecting part being used to be welded to the tab, and the second connecting part being used to be welded to the shell to achieve electrical connection between the tab and the shell;

wherein the first connecting part and the second connecting part are made of different materials, the first connecting part and the tab are made of the same material, and the second connecting part and the shell are made of the same material;

wherein the first connecting part and the second connecting part are stacked along the thickness direction of the current collecting member, and the first connecting part is arranged on the side of the second connecting part facing the electrode assembly; and wherein the second connecting part is provided with hollow parts penetrating through the second connecting part along the thickness direction; and a welding area is formed at a position of the first connecting part corresponding to the hollow parts, and is used to be welded to the tab.

2. The battery cell according to claim 1, wherein the edge of the second connecting part is flush with the edge of the first connecting part.

3. The battery cell according to claim 2, wherein the first connecting part and the second connecting part are arranged coaxially and have equal radii.

4. The battery cell according to claim 1, wherein the edge of the second connecting part extends the edge of the first connecting part.

5. The battery cell according to claim 4, wherein the first connecting part and the second connecting part are arranged coaxially, and the radius of the second connecting part is greater than the radius of the first connecting part.

6. The battery cell according to claim 1, wherein the second connecting part encloses the periphery of the first connecting part.

7. The battery cell according to claim 6, wherein the first connecting part is provided with a first surface facing the electrode assembly, the second connecting part is provided with a second surface facing the electrode assembly, the first surface is closer to the electrode assembly than the second surface, and the first surface abuts against the tab.

8. The battery cell according to claim 1, wherein the current collecting member is arranged in the shell; and the shell comprises:

a case, provided with a first opening; and an end cover, used to cover the first opening, and used to be connected to the second connecting part.

9. The battery cell according to claim 1, wherein the shell is provided with a second opening, and the current collecting member is used to cover the second opening.

10. The battery cell according to claim 1, wherein the first connecting part is made of copper; and/or, the second connecting part is made of steel.

11. The battery cell according to claim 1, wherein the battery cell is cylindrical.

12. A battery, comprising the battery cell according to claim 1.

13. An electrical device, comprising the battery according to claim 12.

* * * * *